United States Patent [19]
Hagan

[11] 3,872,980
[45] Mar. 25, 1975

[54] CONCRETE BATCHING PLANT MODULE AND METHOD

[76] Inventor: Vincent de P. Hagan, 3920 Frontier Ln., Dallas, Tex. 75214

[22] Filed: Jan. 31, 1973

[21] Appl. No.: 328,387

[52] U.S. Cl. .................... 214/2, 214/17 R, 214/152
[51] Int. Cl. ............................................ B65g 69/00
[58] Field of Search ....... 214/10, 17 R, 2, 501, 152; 259/153, 154

[56] References Cited
UNITED STATES PATENTS

| | | | |
|---|---|---|---|
| 2,886,189 | 5/1959 | Funderburk, Jr. | 214/2 |
| 3,251,484 | 5/1966 | Hagan | 214/2 |
| 3,295,698 | 1/1967 | Ross et al. | 214/2 |
| 3,343,688 | 9/1967 | Ross | 214/2 |

*Primary Examiner*—Frank E. Werner
*Attorney, Agent, or Firm*—Clegg, Cantrell & Crisman

[57] ABSTRACT

Disclosed is a module for use in constructing a concrete batching plant, including both cement and aggregate batchers, conveyor equipment, measuring and control equipment for batching, utilities service equipment and a portion of the plant structural steel, all of which is pre-assembled, tested and adjusted prior to delivery to the plant site.

4 Claims, 2 Drawing Figures

CONCRETE BATCHING PLANT MODULE AND METHOD

BACKGROUND OF THE INVENTION

This invention relates to concrete batching plants, and particularly to a module for use in constructing such a plant and to a method for constructing such a plant.

In the past, concrete batching plants have fallen into two broad classes. One is permanent or long-term high capacity plants consisting generally of silos, bins, batchers, conveyors, scales, control equipment and utility systems including compressed air, water and electrical service lines. Such plants have been built in the past according to the general customs of the chemical engineering process equipment industry, that is, the various parts have been hauled to the plant site and erected piece by piece on a suitable frame-work of structural steel. Permanent batching plants have the advantage of large size, convenient storage of materials near the batching point, and large capacity or through-put rate. Their disadvantages include expense of construction, flowing from the custom of assembling the plant from its basic components at the construction site. This necessitates the completion of considerable delicate or light engineering work at the construction site as well as much testing work to ensure operability of all components and systems. Such light engineering work is inconvenient to perform at a job site and interferes with and delays the performance of heavy engineering work, such as erection of structural steel, etc. The permanence of such plants can also be viewed as a disadvantage, since the dismantling of a plant involves performance in reverse order of substantially all the constructional steps and the re-erection of the plant at another site involves as much work as its original construction.

The other type of concrete batching plant which has become popular relatively recently is the portable plant, such as is exemplified by my U.S. Pat. No. 3,251,484, issued May 17, 1966. Portable plants consist generally of frameworks carrying batchers, conveyors, scales, control equipment and small silos, which frames are equipped with wheels so they may be towed behind a tractor, or are otherwise adapted to be transported from site to site. The portability of such plants is their principal advantage, and it is also an advantage that they can be constructed at a factory instead of at the plant site. Their disadvantages include a relatively small through-put capacity, and a lack of ample material storage capacity at the batching point. The latter disadvantage increases operating costs by necessitating additional labor for frequent refilling of the relatively small materials silos inherent in such portable plants.

SUMMARY OF THE INVENTION

In accordance with the present invention, there is provided a constructional module for a concrete batching plant, which module when used in accordance with the method aspects of the invention overcomes the principal disadvantages outlined above of large permanent batching plants and of portable plants. The module of the invention is constructed to include the aggregate batching equipment, the cement batching equipment, the aggregate conveying equipment, water batching equipment if desired, a portion of the structural frame, and the electrical, compressed air, plumbing and weighing and measuring systems necessary to operate a concrete batching plant. The module thus contains substantially all of the light engineering equipment, and a portion of the heavy engineering equipment. Such a construction has the great advantage that all of the light engineering work can be done in a factory, and the operating equipment can be thoroughly tested and adjusted at the factory instead of at the plant site. Furthermore, economies can be achieved by reason of standardization of the modules, notwithstanding desirable variations in the remainder of the batching plant, dictated by local circumstances such as plant site topography and planned raw material storage capacity.

In accordance with the method aspects of the invention, the constructional module is factory built, as outlined above, provision is made to transport with it at least the gate section of the aggregate storage bin, the module is provided with temporary transportation gear, and after transport to the plant site, the remaining structural steel is integrated with that of the module and the remaining equipment of the plant is assembled on the structural steel.

From the foregoing it can be seen that it is an object of the present invention to provide a concrete batching plant module, and method for using the same, which simplifies the construction of large through-put permanent batching plants, and their eventual disassembly and movement to another location, and to improve the quality of such plants.

The foregoing object, together with others may be best understood from a consideration of the detailed description which follows, together with the accompanying drawings.

DESCRIPTION OF THE PREFERRED EMBODIMENT

Figure 1:
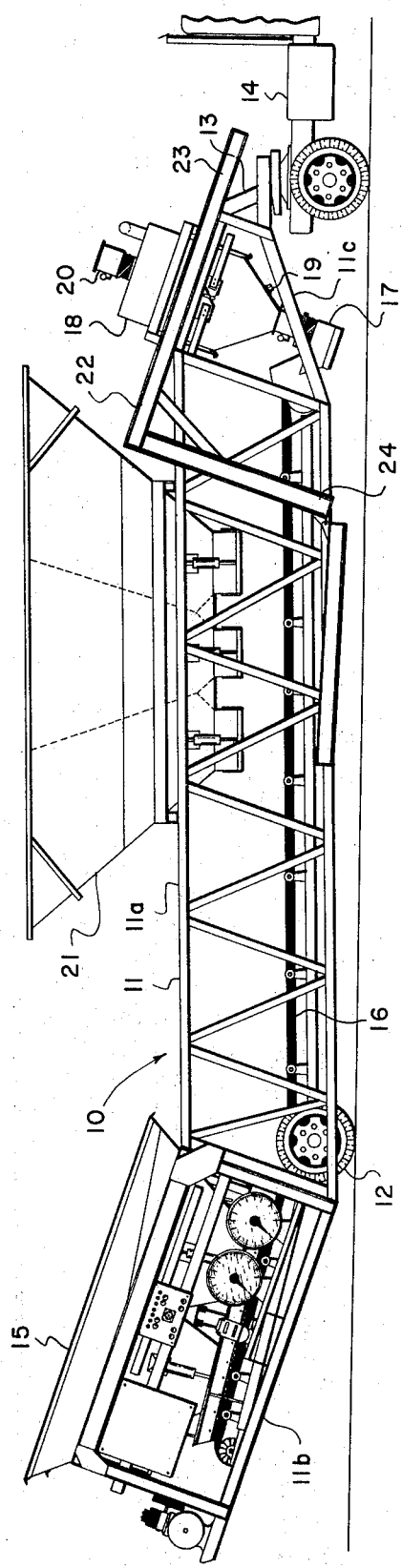
FIG. 1 is a somewhat simplified side elevational view of a concrete batching plant module constructed in accordance with the invention, the module being shown in its transporting position.

FIG. 1 shows a preferred form of the module of the present invention which is designated generally as 10. The module 10 includes a structural steel framework 11 which may be divided for convenience in discussion into a central section 11a, which is horizontal in FIG. 1, a lefthand section 11b, which is angled upwardly in FIG. 1, and a righthand section 11c, which is angled downwardly in FIG. 1. The angles which framework sections 11b and 11c make with the central framework section 11a are complementary so that frame sections 11b and 11c are generally parallel to one another. Thus, when one is oriented generally horizontally (see FIG. 2) the other will be also. The frame 11 is provided with a temporarily mounted pair of transport wheels 12 at the lefthand end of central section 11a, and a removable fifth wheel assembly 13 at the righthand end of section 11c. In this manner the module 10 is rendered mobile, the wheels 12 serving to support the module at one end, and the fifth wheel assembly 13 cooperating with a conventional over-the-road tractor vehicle 14 at the righthand end of the module.

On the lefthand section 11b of the frame, there is mounted an aggregate batcher 15, together with control, weighing and utility equipment discussed in more detail hereinbelow. A belt-type conveyor 16 runs from beneath the aggregate batcher 15, through the central frame portion 11a, to terminate at a discharge hood 17. Mounted above hood 17 on righthand portion 11c of the frame is a cement batcher 18 which includes an air-operated vibrator indicated at 19 and a rotary valve 20 for controlling admission of cement into the top of the batcher. FIG. 1 also shows an aggregate storage bin 21 positioned for travel on the central section 11a of the frame. As will be seen from a consideration of FIG. 2, bin 21 is relocated when the module is installed in the batching plant being erected. As a practical matter, bins 21 of a capacity up to about 80 tons can be transported in the manner illustrated by FIG. 1. When the particular plant in which the module is to be installed contemplates a larger aggregate bin, only the bottom section (including gates and cylinders) is preferably carried on frame 11a in the position shown in FIG. 1, and the remainder of the bin is transported separately.

In accordance with the invention, a portion of the major structural steel framework of the batching plant is also mounted on frame 11 for transport to the job site, where it is integrated with other portions of the major structural framework. This portion is a part of the overhead silo support structure and is designated in FIG. 1 as 22. It can be seen that silo support structure 22 includes beam 23 which will be generally horizontal upon installation of the module in the plant, and hinged beam 24 which will be generally vertical upon such installation. Inasmuch as FIG. 1 as drawn is a two-dimensional drawing, it will be appreciated that beams corresponding to those designated 23 and 24 are provided on each side of frame 11, together with suitable cross beams to produce a strong structure capable of supporting its share of the weight of a large cement silo.

From the foregoing description of the equipment shown in FIG. 1, it can be seen that the module 10 includes or carries on it in a single, easily transported package all of the precision engineered equipment involved in a concrete batching plant. Everything shown in FIG. 1 can be constructed in a factory, and assembled into the organization shown in FIG. 1 under controlled factory conditions. The equipment can then be tested, calibrated and adjusted under controlled factory conditions, prior to being moved to the plant site. This feature is of great advantage because such work can be done with greater precision and efficiency in a factory, and its delicate and time consuming nature does not interfere with the other work progressing at the plant site.

Figure 2:
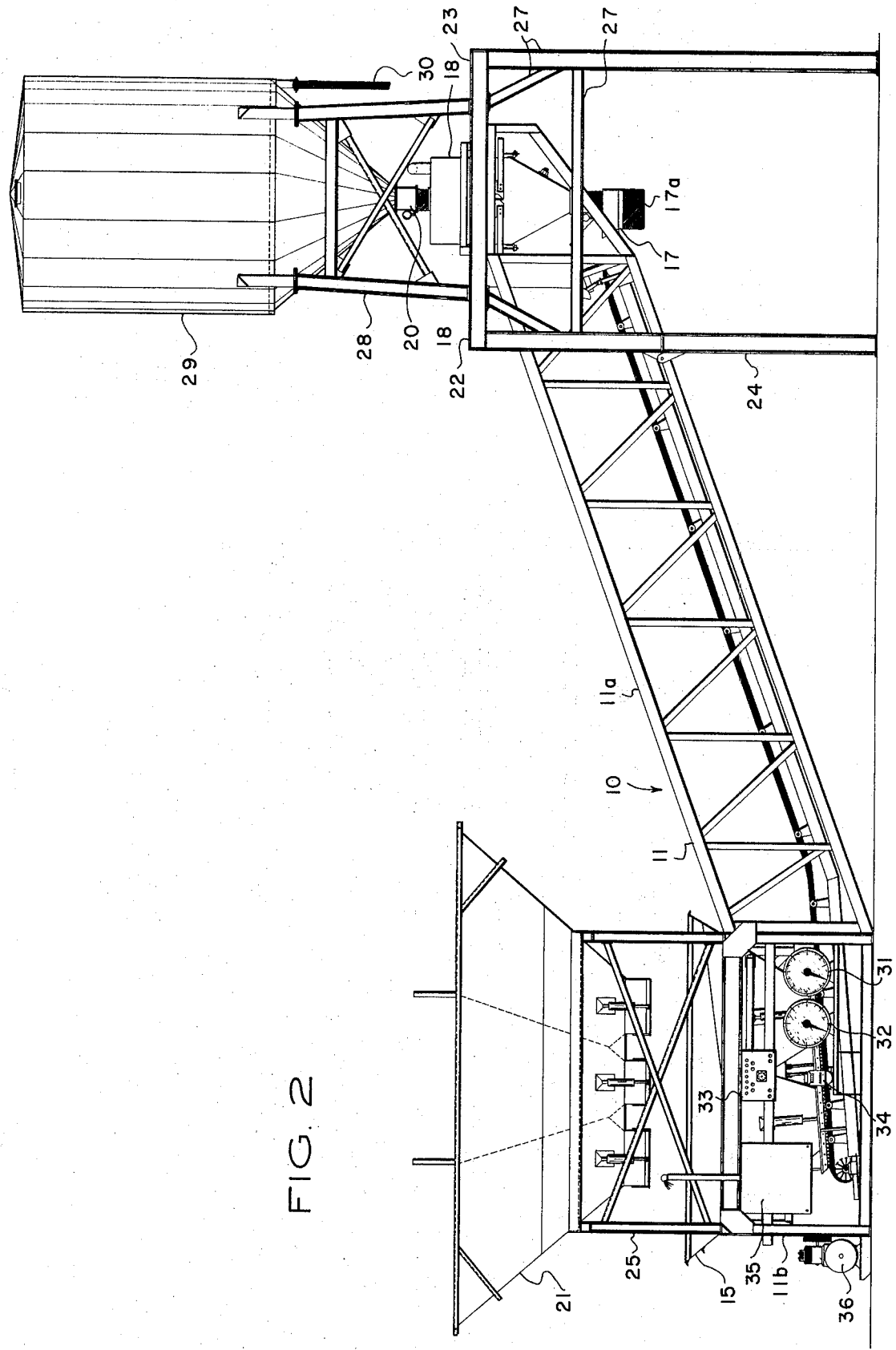
FIG. 2 is a somewhat simplified side elevational view of a concrete batching plant constructed in accordance with the invention, with the module of FIG. 1 being shown integrated into the plant as a whole in its operating position.

Attention is now directed to FIG. 2 which illustrates the module 10 installed and integrated into a complete concrete batching plant in accordance with the invention. The parts already identified in connection with the discussion of FIG. 1 are given the same reference characters in FIG. 2. A comparison of FIGS. 1 and 2 shows that lefthand frame portion 11b and righthand frame portion 11c in FIG. 2 are oriented horizontally, with frame portion 11b being the lower of the two, and with central portion 11a of the frame angled upwardly toward the right as a result. An additional frame 25 is constructed atop lefthand section 11b of the frame 11, and aggregate bin 21 is removed from its transport position on frame 11 (see FIg. 1) to a location on frame 25, in a position to discharge material into aggregate batcher 15.

The overhead silo support structure 22 is completed by the erection of additional beams 27, above which an additional framework 28 is erected to support a cement silo 29. The size of silo 29 may be varied in accordance with the requirements of the particular plant between about 300 barrels capacity and about 1,200 barrels capacity. Silo 29 is provided with an airfill hose 30. The conical base of silo 29 is connected to rotary valve 20 carried on top of cement batcher 18.

The cement batcher 18 and the aggregate batcher 15 are desirably mounted on frame 11 by means of scale equipment, so that batching-by-weight methods may be used for formulating the concrete to specification. The particular scale mounting equipment employed forms no part of the present invention, and reference is made to my before-mentioned U.S. Pat. No. 3,251,484 for a full description of equipment satisfactory for this purpose. It is preferred, however, that the indicators for both the cement scale system and the aggregate scale system be located on frame portion 11b for convenience in one-man operation of the plant. In FIGS. 1 and 2 they are shown as so located, the cement scale indicator being designated 31 and the aggregate scale indicator as 32. Also positioned on frame 11b in a location convenient for one-man operation are an electrical control panel 33 and a water meter 34 which may form part of a water batching system, if such is desired. Frame 11b also has mounted on it a starter panel 35 which contains relays and other electrical equipment and an air compressor 36.

When the equipment has been erected in the manner shown in FIG. 2, it is operated as a conventional batching plant. A truck mounted rotary cement mixer is parked beneath discharge hood 17 (which is desirably provided with a flexible dust hood 17a), the intake chute of the truck being positioned to receive material from hood 17. Aggregate and sand are drawn from bin 21 into batcher 15 and by use of the scale system appropriate amounts of large aggregate and sand are placed on conveyor 16. conveyor 16 is operated to carry the aggregate material to discharge hood 17. Cement is drawn from silo 29 into cement batcher 18 through valve 20 and is also discharged into hood 17 for delivery to the truck mixer.

From the foregoing it can be seen that my invention provides a greatly simplified method of erection of a concrete batching plant, particularly in that it supplies all of the precision equipment of such a plant in factory built and tested form.

What is claimed is:

1. A method for constructing a permanent concrete batching plant comprising assembling onto a framework configured to support a cement batcher at one end and an aggregate batcher at the other end with the cement batcher elevated with respect to the aggregate batcher when the framework is installed in a permanent plant, a cement batcher, an aggregate batcher, a discharge hood, an aggregate conveyor, cement and aggregate weighing equipment, electric and compressed air supply and control equipment and cement silo support means adapted for integration with separately erected silo support means; testing and adjusting said equipment while it is mounted on said framework prior to assembly of the permanent plant; temporarily mounting on said framework wheel travel support means; transporting said framework to a plant site after testing and adjusting such equipment and completing assembly of said plant by permanently erecting separate cement silo support means and integrating them with the cement silo support means mounted on said framework, removing said wheel travel support means, mounting an aggregate bin above said aggregate batcher, and mounting a cement silo on said silo support means above said cement batcher.

2. In a permanent concrete batching plant, the combination comprising:
 a. First frame menas for supporting a cement silo; and a cement silo mounted on said first frame means, said silo and said first frame means being permanently erected at the site of said plant; and
 b. a separately prefabricated module comprising a framework having first and second end sections angled with respect to a central section such that when the end sections are oriented generally horizontally, the second is elevated with respect to the first; means removably mounted on said framework supporting said framework for travel; an aggregate batcher mounted by a scale system on said first framework end section; a discharge hood mounted on said second framework section; conveyor means on said framework for delivering aggregate from beneath said aggregate batcher to said discharge hood; a cement batcher mounted by a scale system on said second framework end section in position to discharge cement downwardly into said hood; electric and compressed air supply and control means mounted on said framework; and support means connected to said framework near the second end section of said framework integrated with and interconnected with said first frame means to provide a complete support means for said silo above the cement batcher with the first and second framework end sections of said module being oriented horizontally and
 c. an aggregate bin mounted above said aggregate batcher.

3. A plant in accordance with claim 2 wherein said support means includes a foldable leg adapted to support the cement batcher end of the framework in an elevated position when extended and to permit a generally horizontal orientation of said framework when folded.

4. A plant in accordance with claim 2 and further comprising water supply means mounted on said framework.

* * * * *